United States Patent Office
3,658,945
Patented Apr. 25, 1972

3,658,945
POLYPHENYLENE OXIDE COMPOSITION
Seizo Nakashio, Nishinomiya, Toshio Takemura, Kyoto, and Kunio Ota, Takatsuki, Japan, assignors to Sumitomo Chemical Company, Ltd., Osaka, Japan
No Drawing. Filed Sept. 25, 1970, Ser. No. 75,669
Claims priority, application Japan, Oct. 1, 1969, 44/78,863; Dec. 6, 1969, 44/98,062
Int. Cl. C08f 41/12
U.C. Cl. 260—876 R
10 Claims

ABSTRACT OF THE DISCLOSURE

The impact resistance of polyphenylene oxide is markedly improved without being impaired excellent characteristics thereof, such as heat resistance, chemical resistance, and mechanical and electrical properties, by blending therewith a graft copolymer obtained from an ethylene-$\alpha$-olefin-polyene terpolymer by graft-polymerizing thereon at least one styrene-type compound in an amount of 3 to 90% by weight based on the weight of graft copolymer, in such a proportion that the amount of ethylene-$\alpha$-olefin-polyene terpolymer component of said graft copolymer is 0.5 to 15% by weight based on the total weight of the resulting composition.

This invention relates to a polyphenylene oxide composition containing a copolymer of an ethylene-$\alpha$-olefin-polyene terpolymer with at least one styrene-type compound grafted thereon.

While polyphenylene oxide has drawn much attention as a resin having excellent heat and chemical resistances, as well as excellent mechanical, electrical and other properties, its impact resistance is not sufficiently high. The polyphenylene oxide composition according to the present invention has a markedly improved impact resistance without impairing its excellent heat resistance. The present composition can be used as electric appliances, electronic articles, business machines, etc.

Concerning the blending of polyphenylene oxide with rubber, there has already been known Japanese patent publication No. 1,482/68 which relates to a composition comprising rubber as a major component, and specifies that the amount of polyphenylene oxide blended in the composition is preferably less than 40% by weight against 60% by weight of rubber. In such a rubber composition the excellent heat resistance of polyphenylene oxide is no longer taken advantage of.

The blending of minor amount of a rubber-like polymer with polyphenylene oxide may be considered as a possible means to improve the impact resistance of polyphenylene oxide without impairing its excellent heat resistance. However, when unsaturated rubbers such as polybutadiene, polyisoprene (including natural rubber), polychloroprene, or the like, are used as the rubber-like polymer, the resulting composition can hardly be regarded as satisfactory with respect to resistances against ozone, weathering and heat. On the other hand, whereas saturated rubbers such as ethylene-propylene rubber, ethylene-propylene-diene terpolymer, and the like, are superior in resistances to ozone, weathering and heat, compared with unsaturated rubbers, their compatibilities with polyphenylene oxide is not satisfactory. When blended with polyphenylene oxide, and particularly as a result of heat history, said saturated rubbers tend to reveal the defect of causing phase separation, and fail in producing the expected result.

An object of the present invention is to improve the impact resistance of polyphenylene oxide.

Another object of the present invention is to provide a polyphenylene oxide composition having desirable properties of polyphenylene oxide and, in addition, an improved impact resistance.

A further object of the present invention is to provide a composition comprising polyphenylene oxide and a copolymer of ethylene-$\alpha$-olefin-polyene terpolymer with at least one styrene-type compound grafted thereon.

Other objects and advantages of the present invention will be made clear from the following description.

As a result of extensive studies, the present inventors have found that by blending polyphenylene oxide with a copolymer of ethylene-$\alpha$-olefin-polyene terpolymer with at least one styrene-type compound grafted thereon, the above-mentioned defect, which is brought about by insufficient compatibility, can be avoided, and a polyphenylene oxide composition having a markedly improved impact resistance as well as an unimpaired heat resistance can be obtained. Based on said finding the present invention have been accomplished.

The polyphenylene oxide used in the present invention contains a structural unit represented by the general formula,

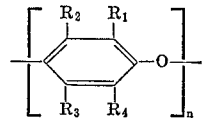

wherein $n$ is a positive integer and is at least 50 each $R_1$, $R_2$, $R_3$ and $R_4$ is hydrogen, halogen, hydrocarbon radical, halohydrocarbon radical, cyanohydrocarbon radical, alkoxy radical, phenoxy radical, which have $C_1$-$C_7$ carbon atoms cyano radical or nitro radical.

Examples of $R_1$, $R_2$, $R_3$ and $R_4$ include hydrogen, chlorine, bromine, iodine, methyl, ethyl, propyl, allyl, phenyl, benzyl, methylbenzyl, chloromethyl, bromomethyl, cyanoethyl, cyano, methoxy, ethoxy, phenoxy, and nitro radicals, etc.

Individual examples include poly-2,6-dimethyl-1,4-phenylene oxide, poly-2,6-diethyl-1,4-phenylene oxide, poly-2,6-dipropyl-1,4-phenylene oxide, poly-2-methyl-6-isopropyl-1,4-phenylene oxide, poly-2-methyl-6-allyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-diphenyl-1,4-phenylene oxide, poly-2,6-ditolyl-1,4-phenylene oxide, poly-2,6-dichloro-1,4-phenylene oxide, poly-2-methyl-6-nitro-1,4-phenylene oxide, poly-2,5-dimethyl-1,4-phenylene oxide, poly-2-methyl-1,4-phenylene oxide, etc.

Any $\alpha$-olefin having 3 to 20 carbon atoms may be used as a second monomer of ethylene-$\alpha$-olefin-polyene terpolymer graft-polymerized with at least one styrene-type compound, which is used in the present invention. As examples of these $\alpha$-olefins, may be mentioned propylene, 1-butene, 1-pentene, 1-hexene, 1-heptene, styrene, p-isopropylstyrene, vinylcyclohexane, etc., propylene being the most important of these $\alpha$-olefins.

Next, as polyenes, the third monomers, may be mentioned 1,4-hexadiene, 1,6-octadiene, 2-methyl-1,5-hexadiene, 6-methyl-1,5-heptadiene, 7-methyl-1,6-octadiene, 11-ethyl-1,11-tridecadiene, 9-ethyl-1,9-undecadiene, isoprene, 1,4-pentadiene, 1,3-pentadiene, 1,4,9-decatriene, myrcene, 1-phenyl-1,3-butadiene, p-diallylbenzene, p-bromoallylbenzene, 4-vinyl-1-cyclohexene, 1,3,5-trivinylcyclohexane, trans-1,2-divinylcyclobutane, 1,5-cyclooctadiene, 1,3,5-cycloheptatriene, 1,5,9-cyclododecatriene, 1,4-cycloheptadiene, cyclopentadiene, 2,2'-dicyclopentenyl, 1,4-bis(cyclopenten-2-yl) butane, 4,7,8,9-tetrahydroindene, 6-methyl-4,7,8,9-tetrahydroindene, bicyclo(3,3,0)-octadiene-2,6-dicyclopentadiene, 2-methyl-2,5-norbornadiene, 5-methylene-2-norbornene, 5-ethylidene-2-norbornene, 5-isopropylidene-2-norbornene, 5-isopropenyl-2-norbornene, 5-(2'-methyl-1'-propenyl)-2-norbornene, 5-(1', 2'-dimethyl-1'-propenyl)-2-norbornene, 5-(2'-butenyl)-2-norbornene, 6-methyl-5-(2'-butenyl)-2-norbornene, 6-(3'-cyclohexenyl)2-norbornene, tricyclopentadiene, 6-chloromethyl-5-isopropenyl-2-norbornene, etc.

The terpolymers used in the present invention are preferably of the well known composition, that is, 40 to 90% by mole of ethylene, 10 to 60% by mole of an α-olefin, and 0.3 to 20% by mole of a polyene compound, preferably 60 to 85% by mole of ethylene, 15 to 35% by mole of an α-olefin, and 1 to 5% by mole of a polyene compound, and are, in addition, of the composition wherein more than 20% by mole of a polyene compound are contained. Also, ethylene and αolefin may be contained in amounts outside the ranges given above.

The present invention includes also a composition wherein a pretreated terpolymer such as, for example, chlorinated terpolymer is used in place of the above-mentioned terpolymer in order to facilitate the graft polymerization of a terpolymer with a styrene-type compound.

The styrene-type compounds used in the present invention to be grafted onto ethylene-α-olefin-polyene terpolymers, are represented by the general formula,

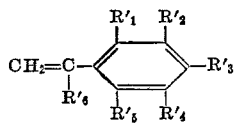

wherein each of $R'_1$, $R'_2$, $R'_3$, $R'_4$ and $R'_5$ represents hydrogen, halogen, cyano, nitro, hydroxyl, amino, carboxyl, vinyl, alkyl, substituted alkyl, aryl, substituted aryl, hydrocarbonoxy, or substituted hydrocarbonoxy radical, which have $C_1$–$C_8$ carbon atoms and $R_6$ represents hydrogen, alkyl radical or phenyl radical.

These styrene-type compounds are used in the form of a styrene ($R'_6$ is hydrogen) alone, an α-alkyl-substituted styrene ($R'_6$ is alkyl) alone, a mixture of two or more styrenes, a mixture of two or more α-alkyl-substituted styrenes, and a mixture of at least one styrene and at least one α-alkyl-substituted styrene.

Examples of $R'_1$, $R'_2$, $R'_3$, $R'_4$ and $R'_5$ are hydrogen, chlorine, bromine, iodine, methyl, ethyl, propyl, allyl, phenyl, benzyl, methylbenzyl, chloromethyl, bromomethyl, cyanoethyl, cyano, nitro, amino, methoxy, ethoxy, phenoxy, etc. Examples of $R'_6$ are hydrogen and a methyl radical.

Examples of the styrene-type compounds are styrenes such as styrene, 2,4-dichlorostyrene, p-nitrostyrene, p-methoxystyrene, p-methylstryene, o-methylstyrene, m-methylstyrene, p-phenylstyrene, p-acetoxystyrene, p-(chloromethoxy)styrene, p-aminostyrene, m-cyanostyrene, o-hydroxystyrene, p-hydroxystyrene, p-divinylbenzene, etc., and α-alkyl-substituted styrenes such as α-methylstyrene, α,o-dimethylstyrene, α-m-dimethylstyrene, α-p-dimethylstyrene, p-methoxy-α-methylstyrene, 1,1-diphenylethylene, etc.

The copolymer of ethylene-α-olefin-polyene terpolymer with at least one styrene-type compound grafted thereon may be prepared by any one of well known polymerization processes such as suspension polymerization, emulsion polymerization, solution polymerization or bulk polymerization.

In the present invention, a copolymer of ethylene-α-olefin-polyene terpolymer with at least one styrene compound grafted thereon is blended with a polyphenylene oxide, whereby the poor compatibility of the ethylene-α-olefin-polyene terpolymer, which have excellent resistances against hat, ozone and weathering, with the polyphenylene oxide is improved and the impact resistance of the polyphenylene oxide is also improved without impairing excellent properties indigenous to polyphenylene oxide such as heat resistance.

Therefore, to achieve said object it is preferable to use the graft polymer which is obtained from the copolymer of ethylene-α-olefin-polyene terpolymer produced by grafting styrene-type compounds onto an ethylene-α-olefin-polyene terpolymer in above-said well known ways, by removing a homopolymer of styrene-type compounds, which has not taken part in the graft polymerization, by extracting with a solvent, in which the graft polymer of ethylene-α-olefin-polyene terpolymer with styrene-type compounds is insoluble while the homopolymer of styrene-type compounds is soluble, such as methyl ethyl ketone. However, said treatment for removing homopolymer of styrene-type compounds can be omitted in the case where the graft polymer of ethylene-α-olefin-polyene terpolymer, obtained by grafting styrene-type compounds thereon, has a high content of ethylene-α-olefin-polyene terepolymer as well as a high graft percentage, and, moreover, the content of homopolymer of styrene-type compounds therein is so small that the modifying effect of said homopolymer upon the polyphenylene oxide may substantially be neglected when said graft polymer is blended with the latter.

The content of styrene-type compounds in the graft polymer used in the present invention is 3 to 90% by weight, preferably 5 to 80% by weight.

In the case where the polymer produced from an ethylene-α-olefin-polyene terpolymer by grafting thereon with a styrene compound is used without removing homopolymer of the latter, the content of said homopolymer of a styrene-type compound in the composition obtained by blending said graft polymer with a polyphenylene oxide is preferably less than 15% by weight, more preferably less than 10% by weight based on the weight of the composition.

The method of this invention can be carried out in various ways. As the method suitable for blending the above-mentioned polymers, there may be utilized any known method, that is, mechanical mixing by means of a roller mill, a Banbury mixer, or the like, or mixing in solution or in suspension.

The copolymer obtained by grafting a styrene-type compound onto an ethylene-α-olefin-polyene terpolymer can be incorporated into polyphenylene oxide in any proportion without limit. However, in order that the resulting composition may retain the properties of the polyphenylene oxide, such as heat resistance, etc., said graft copolymer of ethylene-α-olefin-polyene terpolymer with a styrene-type compound should be blended in such amount that the amount of ethylene-α-olefin-polyene terpolymer component of the graft copolymer is 0.5 to 15% by weight, preferably 1 to 10% by weight based on the total amount of the resulting composition. Still more preferably result is obtained when the amount of ethylene-α-olefin-polyene component of the graft copolymer in the composition is within the range given above, and, at the same time, the amount of said graft copolymer in the composition is less than 30% by weight, preferably 1 to 20% by weight. Two or more kinds of graft copolymer may be incorporated in a polyphenylene oxide.

The present composition obtained by proper blending shows markedly increased impact resistance in comparison with polyphenylene oxide alone, and there is observed no such phenomenon of phase separation that occurs in a polyphenylene composition containing an ethylene-α-olefin-polyene terpolymer, as will be shown in examples hereunder.

The following examples are merely illustrative of the present invention, and the present invention is not restricted to said examples.

EXAMPLE 1

A composition was prepared from 90 parts by weight of poly-2,6-dimethyl-1,4-phenylene oxide having an intrinsic viscosity of 0.57 dl./g., as measured in chloroform at 25° C., and 10 parts by weight of the ethylene-propylene - dicyclopentadiene terpolymer - styrene graft polymer (54% of terpolymer component and 46% of polystyrene component) obtained after removing homopolymer of styrene, which had taken no part in the graft polymerization, by extraction with methyl ethyl ketone from a polymer prepared by grafting styrene onto an ethylene - propylene - dicyclopentadiene terpolymer ("Royalene 301," trade name of Uniroyal Co.) in an aqueous suspension using tert-butylperoxyisobutyrate as a catalyst. Said composition was milled on a roller mill at 290° C. for 7 minutes, and then pressed at 280° C. under a load of 120 kg./cm.² for 5 and 15 minutes to perpare test pieces for measuring impact resistance.

On the other hand, other two compositions were prepared for comparison, the one (comparative composition I) being composed of 94.6 parts by weight of the above-said polyphenylene oxide and 5.4 parts by weight of the above-said ethylene-propylene-dicyclopentadiene terpolymer, and the other (comparative composition II) being composed of 90 parts by weight of the above-said polyphenylene oxide, 5.4 parts by weight of the above-said ethylene - propylene - dicyclopentadiene terpolymer, and 4.6 parts by weight of polystyrene ("Esbrite 6," made by Nihon Polystyrene Co., Ltd.). Each composition was milled on a roller mill at 290° C. for 7 minutes, and then pressed at 280° C. under a pressure of 120 kg./cm.² for 5 minutes or 15 minutes to prepare test pieces for measuring impact strength.

Charpy impact strength (notched, 20° C.) was determined on each test piece thus prepared, in accordance with ASTM D256-54T, to obtain the results as shown in Table 1-1.

TABLE 1-1

| | The present composition | | Comparative composition | | | |
|---|---|---|---|---|---|---|
| | | | I | | II | |
| Time of pressing (min.) | 5 | 15 | 5 | 15 | 5 | 15 |
| Charpy impact strength (kg. cm./cm.²) | 17 | 16 | 14 | 7 | 16 | 6 |

Test pieces of the present composition all showed a whitened fracture on impact, whereas those of comparative compositions I and II pressed for 15 minutes showed only a partially whitened fracture owing to the phase separation between ethylene-propylene-dicyclopentadiene terpolymer and polyphenylene oxide.

Further, the present composition was compared with polyphenylene oxide alone by carrying out tensile test and flexural test. The results are as shown in Table 1-2.

TABLE 1-2

| | The present composition | Polyphenylene oxide alone |
|---|---|---|
| Tensile strength (kg./cm.²) | 790 | 750 |
| Flexural strength (kg./cm.²) | 950 | 940 |

The tensile strength was measured on the Japanese Industrial Standard No. 3 dumb-bell of 1 mm. in thickness prepared from a press sheet by autograph (Shimadzu Seisakusho, Type P100) at a stretching rate of 10 mm./min. at 20° C. in accordance with ASTM D638-52T.

The flexural strength was measured according to ASTM D790-49T.

EXAMPLE 2

Several compositions were prepared from a poly-2,6-dimethyl-1,4-phenylene oxide, having an intrinsic viscosity of 0.70 dl./g. as measured in chloroform at 25° C., obtained by polymerizing 2,6-dimethylphenol by oxidative coupling using manganese(II)chloride - sodium methylate as catalyst, and a graft copolymer (40% by weight of terpolymer component and 60% by weight of polystyrene component) obtained by grafting styrene onto an ethylene-propylene-dicyclopentadiene terpolymer ("Royalene 301," trade name of Uniroyal Co.). Each composition was added with 0.5 part by weight of 2,2'-methylene-bis(6-tert-butyl - 4 - methylphenol) (made by Sumitomo Chemical Co. Ltd.) and 0.5 part by weight of trisnonylphenyl phosphite (made by Sumitomo Chemical Co. Ltd.) as stabilizers, and milled on a roller mill at 290° C. for 7 minutes, and then pressed at 270° C. under a pressure of 120 kg./cm.² for 15 minutes, to prepare test pieces for measuring the impact strength. The Charpy impact strength were measured on each test piece thus obtained, according to ASTM D256-54T to obtain the results as shown in Table 2.

TABLE 2

| | | | | | |
|---|---|---|---|---|---|
| Polyphenylene oxide (part by weight) | 100 | 98 | 95 | 90 | 80 |
| Copolymer of ethylene-propylenediene terpolymer with styrene grafted thereon (part by weight) | 0 | 2 | 5 | 10 | 20 |
| Charpy impact strength (kg. cm./cm.²) | 7 | 12 | 17 | 22 | 25 |

EXAMPLE 3

A composition was prepared from 92 parts by weight of the same polyphenylene oxide as that used in Example 2, and 8 parts by weight of a graft copolymer (50% by weight of terpolymer component and 50% by weight of polystyrene component) obtained by grafting styrene onto an ethylene-propylene-ethylidene norbornene terpolymer ("Royalene 501," trade name of Uniroyal Co.). Said composition was added with the same stabilizers in the same amounts as used in Example 2, and pressed in the same manner as in Example 2 to prepare test pieces for measuring impact strength. The results of impact strength measurement were as shown in Table 3.

TABLE 3

| | Polyphenylene oxide alone | The present composition |
|---|---|---|
| Charpy impact strength (kg. cm./cm.²) | 6 | 16 |

EXAMPLE 4

A composition was prepared from 90 parts by weight of poly - 2,6 - dimethyl - 1,4 - phenylene oxide having an intrinsic viscosity of 0.63 dl./g. as measured in chloroform at 25° C., and 10 parts by weight of a copolymer (45% by weight of terpolymer component and 55% by weight of poly-p-methylstyrene component) of ethylene-propylene-dicyclopentadiene terpolymer ("Royalene 301," trade name of Uniroyal Co.) with p-methylstyrene grafted thereon. Said composition was added with the same stabilizers in the same amounts as used in Example 2, and pressed in the same manner as in Example 2 to prepare test pieces for measuring impact strength.

The results of measurement of impact strength made on said test pieces were as shown in Table 4.

TABLE 4

| | Polyphenylene oxide alone | The present composition |
|---|---|---|
| Charpy impact strength (kg. cm./cm.²) | 5 | 19 |

EXAMPLE 5

A composition was prepared from 92 parts by weight of poly - 2,6 - dimethyl - 1,4 - phenylene oxide having an intrinsic viscosity of 0.63 dl./g. as measured in chloroform at 25° C., and 8 parts by weight of a copolymer (53% by weight of terpolymer component and 47% by weight of dimethylstyrene-styrene copolymer component) obtained by grafting a mixture containing 11 parts by weight of α,m-dimethylstyrene and 9 parts by weight of α,p-dimethylstyrene onto an ethylene-propylene-ethylidenenorbornene terpolymer ("Royalene 501," trade name of Uniroyal Co.). Said composition was added with the same stabilizers in the same amounts as used in Example 2, and pressed in the same manner as in Example 2 to prepare test pieces for measuring impact strength. The results of measurement of impact strength made on said test pieces were as shown in Table 5.

TABLE 5

|  | Polyphenylene oxide alone | The present composition |
|---|---|---|
| Charpy impact strength (kg. cm./cm.²) | 6 | 15 |

EXAMPLE 6

An ethylene-propylene-dicyclopentadiene terpolymer-styrene graft polymer was synthesized by graft-polymerizing styrene onto an ethylene-propylene-dicyclopentadiene terpolymer ("Royalene 301," trade name of Uniroyal Co.) in suspension using tert-butyl peroxypivalate as a catalyst. Said graft polymer was composed of 33 parts by weight of an ethylene-propylene-dicyclopentadiene terpolymer and 67 parts by weight of polystyrene, of which 27 parts by weight were found to be homopolymer of styrene by an extraction with methyl ethyl ketone. Without being subjected to an extraction treatment for removing homopolystyrene, said graft polymer was milled with poly - 2,6 - dimethyl - 1,4 - phenylene oxide having an intrinsic viscosity of 0.59 dl./g. as measured in chloroform at 25° C., on a roller mill at 290° C. for 7 minutes, and pressed at 280° C. under a pressure of 120 kg./cm.² for 15 minutes to prepare test pieces for measuring impact strength. Charpy impact strength (notched, 20° C.) was measured on the test pieces thus prepared, according to ASTM D256–54T to obtain the results as shown in Table 6.

TABLE 6

| Polyphenylene oxide (parts by weight) | 94 | 88 | 82 |
|---|---|---|---|
| Copolymer of ethylene-propylenedicyclopentadiene terpolymer with styrene grafted thereon (parts by weight) | 6 | 12 | 18 |
| Charpy impact strength (kg. cm./cm.²) | 13 | 16 | 17 |

What is claimed is:

1. A polyphenylene oxide composition comprising a graft copolymer in which at least one unsubstituted or substituted styrene compound is grafted on a terpolymer of ethylene, α-olefin having at least 3 carbons atoms, and a polyene selected from the group consisting of diene and triene, in an amount of 5 to 80% by weight based on the total weight of the graft copolymer, said unsubstituted or substituted styrene compounds being represented by the general formula:

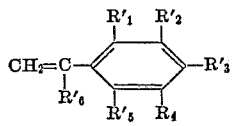

wherein
each $R'_1$, $R'_2$, $R'_3$, $R'_4$ and $R'_5$ is any member of the group consisting of hydrogen, halogen, cyano, nitro, hydroxyl, amino, carboxyl, vinyl, alkyl, substituted alkyl, aryl, substituted aryl, hydrocarbonoxy, and substituted hydrocarboxy radicals which have $C_1$–$C_8$ carbon atoms, and $R'_6$ is hydrogen, alkyl radical or phenyl radical; the amount of said graft copolymer in the composition being less than 30% by weight and a polyphenylene oxide having a structural unit represented by the general formula:

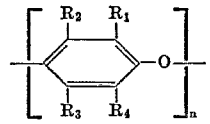

wherein
$n$ is a positive integer and is at least 50, each $R_1$, $R_2$, $R_3$ and $R_4$ is any member of the group consisting of hydrogen, halogen, hydrocarbon, halohydrocarbon, cyanohydrocarbon, alkoxy, phenoxy, which have $C_1$–$C_7$ carbon atoms, cyano and nitro radicals;
the proportion of the said terpolymer component of said graft copolymer to the composition being 1 to 10% by weight.

2. A composition according to claim 1, wherein the amount of the terpolymer of ethylene, α-olefin, and polyene with at least one unsubstituted or substituted styrene compound grafted thereon is 1 to 20% by weight based on the total weight of the composition.

3. A composition according to claim 1, wherein the unsubstituted or substituted styrene compound is at least one compound selected from the group consisting of styrene and α-alkyl-substituted styrene.

4. A composition according to claim 1, wherein the α-olefin is propylene.

5. A composition according to claim 1, wherein the polyene is dicyclopentadiene or ethylidene norbornene.

6. A composition according to claim 1, wherein the terpolymer is ethylene-propylene-dicyclopentadiene or ethylene-propylene-ethylidene norbornene.

7. A composition according to claim 1, wherein the unsubstituted or substituted styrene compound is styrene.

8. A composition according to claim 1, wherein the unsubstituted or substituted styrene compound is a mixture of styrene and α,p-dimethylstyrene, a mixture of styrene and α,m-dimethylstyrene, or a mixture of styrene, α,p-dimethylstyrene and α,m-dimethylstyrene.

9. A composition according to claim 1, wherein the terpolymer is a chlorinated terpolymer.

10. A composition according to claim 1, wherein the terpolymer is composed of 40 to 90% by mole of ethylene, 10 to 60% by mole of an α-olefin, and 0.3 to 20% by mole of a polyene compound.

References Cited
UNITED STATES PATENTS

| 3,383,435 | 5/1968 | Cizek | 260—874 |
| 3,489,821 | 1/1970 | Witt et al. | 260—876 |
| 3,383,340 | 5/1968 | MacCallum et al. | 260—887 X |
| 3,373,226 | 3/1968 | Gowan | 260—874 |

MURRAY TILLMAN, Primary Examiner

C. SECCURO, Assistant Examiner

U.S. Cl. X.R.

260—45.7 P, 45.95, 874, 887, 890, 897 R